United States Patent Office 3,244,753
Patented Apr. 5, 1966

3,244,753
PROCESS FOR MANUFACTURE OF ACETALS
Robert E. Leary, Westfield, N.J., assignor to General Aniline & Film Corporation, New York, N.Y., a corporation of Delaware
No Drawing. Filed July 27, 1961, Ser. No. 127,142
8 Claims. (Cl. 260—613)

This invention relates to an improved process for preparing surface-active non-ionic acetals of monoethers of mono- and polyalkylene glycols.

Surface-active monoethers of mono- and polyalkylene glycols in which the ether-forming radical is the residue of a phenol or a monohydric alcohol, are subject generally to discoloration and degradation when employed as surface-active agents in aqueous alkaline media. However, their use in such media is often desirable in order to increase the rate of penetration or wetting of the solution, or to decrease its surface tension.

It has been found that acetals of the aforesaid surface-active glycol mono-ethers, which can be produced therefrom by condensation in the presence of an acidic catalyst with a vinyl ether, are relatively stable to degradation and discoloration in aqueous alkali. At the same time, they are characterized by a high degree of detergency coupled with little or no tendency to foam. However, preparation of the aforesaid acetals by condensation of the surface-active glycol mono-ethers with vinyl ethers ordinarily results in discoloration which can only be removed by relatively costly, and in some cases destructive, purifying treatment e.g. with decolorizing charcoal or peroxides. Without such treatments, discoloration formed during the vinyl ether condensation offsets or nullifies the benefits from the color stability of the products toward aqueous alkali.

It is an object of this invention to inhibit formation of colored impurities in the condensation of vinyl ethers with surface-active glycol mono-ethers to form the aforesaid acetals, and thereby avoid discoloration of the products.

In accordance with this invention, hypophosphorous acid, phosphorous acid, a salt of said acids or a phosphorous acid ester is incorporated as a color stabilizer in the condensation reaction mixture in a catalytic amount prior to condensation of the glycol monoether with the vinyl ether. Suitable catalytic amounts of the aforesaid color stabilizer range, for example, from 0.01 to 5% and preferably from 0.1 to 1% of the weight of the surface-active glycol ether undergoing acetalization.

Surface-active glycol ethers suitable for condensation with vinyl ethers in the improved process of this invention have the general formula:

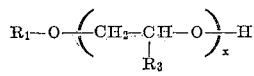

wherein $R_1$ is a hydrocarbon group of 8–30 carbon atoms, $R_3$ is hydrogen or a methyl group, and X is an integer from 1 to 100. Vinyl ethers suitable for effecting acetalization of the aforesaid surface-active glycol ethers have the following formula:

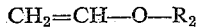

wherein $R_2$ represents a hydrocarbon group of 1 to 18 carbon atoms. The resulting acetals have the formula:

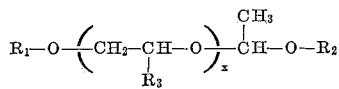

Catalysts suitable for promoting condensation of the aforesaid surface-active glycol ethers with vinyl ethers are acidic catalysts—for example, strong mineral acids such as HCl, $H_2SO_4$ or $H_3PO_4$, organic sulfonic acids such as benzene sulfonic acid or paratoluene sulfonic acid, borontrifluoride and coordinated complexes thereof, and also phosphorous and hypophosphorous acids, the latter serving not only as acidic catalysts, but also exerting their color-stabilizing effect in accordance with the present invention.

Instead of free phosphorous and hypophosphorous acids, there can be used their salts, e.g. their alkali metal (Na, K), alkaline earth metal (Ca, Ba, Sr or Mg), aluminum or ammonium salts, or salts thereof with organic nitrogen bases such as mono-, di- or tri-methyl amine, mono-, di- or tri-ethanolamine, morpholamine or pyridine.

Similarly, esters of phosphorous acid can be used as color stabilizers in place of the free acids or their salts. Such esters include mono-, di- and tri-esters in which the organic radical can be an alkyl, aryl or cycloalkyl group. Thus they include, for example, ethyl phosphite, lauryl phosphite, oxotridecyl phosphite (of which the alcohol moiety is produced from tetra-propylene or di-isobutylene by catalytic reaction with carbon monoxide and hydrogen in the so-called "Oxo" (process), stearyl phosphite, phenyl phosphite, cyclohexyl phosphite, the corresponding di- and tri-esters of phosphorous acid, ethyl-phenyl-phosphite, dipropyl - phenyl - phosphite, lauryl-cyclohexyl-phosphite and the like.

Hypophosphorous or phosphorous acids, their salts or the esters of phosphorous acid are employed in the reaction mixture in amounts ranging from 0.01 to 5% and preferably from 0.1 to 1.0% of the weight of the non-ionic surface-active glycol ether subjected to acetalization. The color stabilizers are advantageously added to the non-ionic surface-active glycol ether before adding the vinyl ether.

In carrying out the acetalization in accordance with the invention, moisture is initially removed from the non-ionic surface-active glycol ether, for example, by heating at a temperature from 100 to 125° C. for 15 to 30 minutes under reduced pressure (e.g. 25 mm. of mercury). The color-stabilizing phosphorous or hypophosphorous acid compound, and the acidic condensation catalyst can be added to the glycol ether before dehydration—especially if they contain moisture or water of crystallization. The quantity of acidic catalyst (including free phosphorous or hypophosphorous acid when either of these is employed as the color stabilizer) can range from about 0.2 to 2% by weight of the glycol ether surfactant undergoing acetalization.

The temperature of the mixture containing the color stabilizer, acidic catalyst and surface-active non-ionic glycol ether is adjusted to a level suitable for condensation e.g. 30 to 60° C., the mixture is agitated and the vinyl ether is added gradually e.g. over a period of ¾ to 3 hrs. The amount of vinyl ether can be substantially the stoichiometric equivalent of the glycol monoether, or an exess can be used e.g. up to an excess of the order of 100%. Generally an excess of 10 to 20% over the stoichiometric equivalent of the monoether is suitable. Agitation is continued for approximately an hour at condensation temperature after addition of the vinyl ether to complete the reaction. The mixture can then be neutralized e.g. by adding an organic tertiary amine such as triethyl- or trimethylamine.

The invention will be more fully understood from the following examples, wherein parts and percentages are by weight, unless otherwise indicated, and the color is given in terms of units of the Varnish Color Scale: Gardner's Color Scale, Standards of 1933 (herein abbreviated as "VCS").

Example 1

129 g. (0.15 gram mol) of a monotridecyl ether of polyethylene glycol, obtained by condensing tridecyl alcohol with 15 molecular equivalents of ethylene oxide, 0.078 g. of paratoluene-sulfonic acid (i.e.

$$CH_3 \cdot C_6H_4 \cdot SO_3H \cdot H_2O)$$

and 0.6 ml. of aqueous 50% hypophosphorous acid were mixed together and heated with agitation for 15 minutes at 120° C. under reduced pressure (25 mm. of mercury) to remove moisture. The mixture was cooled to 35° C., the vacuum released, and 18 g. (0.18 gram mol) of n-butyl vinyl ether were gradually added over a period of 2½ hours while maintaining the temperature at 35 to 40° C. The mixture was agitated at the same temperature for an additional hour, and then neutralized with triethyl amine. The yield of monotridecyl-polyethyleneglycol-ether n-butyl-acetal (as determined by the decrease in the hydroxyl number) was 94% of theory, and the product had a VCS color of 1.

The foregoing procedure was repeated, except that the quantity of 50% hypophosphorous acid was increased to 1 ml. and paratoluene-sulfonic acid was omitted. The same acetal was obtained in a yield of 80% of theory, and had a VCS color of 1.

As a control, 86 g. (0.1 gram mol) of the aforesaid monotridecyl ether of polyethylene glycol were mixed with 0.6 g. of paratoluene-sulfonic acid, and after removal of moisture as above, 12.0 g. (0.12 gram mol) of n-butyl vinyl ether were gradually added, while agitating, over a period of 50 minutes at 35–40° C. After continuing agitation of the mixture at the same temperature for an additional hour, the mixture was neutralized as in the preceding procedure. The resulting acetal was recovered in a yield of 95% of theory, but had a VCS color of 11–12.

Example 2

A mixture of 86 g. (0.1 gram mol) of the monotridecyl ether of polyethylene glycol of the preceding example, and 0.6 ml. of 50% hypophosphorous acid was heated 15 minutes at 120° C., at an absolute pressure of 25 mm. of mercury, in order to remove moisture. After cooling to 35° C., vacuum was released and 14.1 g. (0.196 gram mol) of ethyl vinyl ether were gradually added over a period of 50 minutes while agitating and maintaining the temperature at 35 to 40° C. After all of the ethyl vinyl ether was added, agitation was continued for an hour at the aforesaid temperature, and the mixture then allowed to cool and neutralized with triethylamine. The monotridecyl-poly-ethyleneglycolether ethyl-acetal contained in the reaction mixture was produced in a yield of 63% of theory and had a VCS color of 1.

Upon repeating the procedure of this example but substituting 0.26 g. of paratoluene sulfonic acid for hypophosphorous acid, the acetal in the reaction mixture was produced in a yield of 61%, having a VCS color of 7.

Example 3

143 g. (0.5 gram mol) of a nonylphenyl monoether of a mixture of mono and polyethylene glycol, obtained by condensing nonylphenol with 1.5 molecular equivalents of ethylene oxide, were mixed with 1.5 ml. of 50% hypophosphorous acid and moisture removed as in the preceding examples. This mixture was cooled to 30–35° C., and while agitating at this temperature, 43 g. (0.55 gram mol) of ethyl vinyl ether were added over a period of 2½ hours. Agitation of the mixture at this temperature was continued for an additional hour, and the mixture was then cooled and neutralized as in the preceding examples. The acetal was produced in a yield of 92% of theory and exhibited a VCS color of 2.5.

The procedure of this example was repeated using 3.0 g. of paratoluene sulfonic acid instead of hypophosphorous acid. The yield of acetal in this case was 92% of theory, but the product had a VCS color of 16.

Example 4

123 g. (0.2 gram mol) of a nonylphenyl monoether of polyethyleneglycol, obtained by condensing nonylphenol with 9 molecular equivalents of ethylene oxide, were mixed with 0.7 g. of paratoluene sulfonic acid and 0.5 ml. of 50% hypophosphorous acid. After removing moisture from the mixture as in the preceding examples, the mixture was cooled to 30–35° C., and 17.2 (0.22 gram mol) of ethyl vinyl ether were added over a period of 2½ hours while agitating and maintaining the temperature within the aforesaid range. Agitation at the same temperature was continued for an additional hour after addition of the ethyl vinyl ether was complete, and the mixture was then neutralized as in the preceding examples. The reaction mixture contained the resulting acetal in a yield of 88% of theory, and exhibited a VCS color of 1.

Repetition of the foregoing procedure omitting hypophosphorous acid produced the same acetal in a yield of 86% of theory, but having a VCS color of 5.

Example 5

154 g. (0.2 gram mol) of the dinonylphenyl monoether of polyethyleneglycol obtained by condensing dinonylphenol with 9.6 mols of ethylene oxide were mixed with 0.92 g. of paratoluene sulfonic acid and 0.6 ml. of 50% hypophosphorous acid. After removing moisture as in the preceding examples, the temperature was adjusted to 30–35° C. and 22 g. (0.22 gram mol) of n-butyl vinyl ether were added over a period of 2.5 hours while agitating and maintaining the temperature within the aforesaid range. The reaction was completed by continuing agitation for an additional hour at the same temperature, and the mixture neutralized with triethyl amine. The resulting acetal was produced in a yield of 82% and had a VCS of 1.

Repetition of the procedure of this example, employing 0.3 g. of sodium hypophosphite instead of hypophosphorous acid yielded the same acetal having a VCS color of 2.

Upon repeating the procedure omitting hypophosphorous acid and its salt, the acetal was obtained in a yield of 84% of theory but had a VCS color of 10.

Example 6

A mixture of 115 g. (0.2 gram mol) of oleyl monoether of polyethylene glycol, obtained by condensing oleyl alcohol with 7 molecular equivalents of ethylene oxide, were mixed with 0.58 g. of paratoluene sulfonic acid and 0.5 ml. of 50% hypophosphorous acid. The monoether was condensed with 15.9 g. of ethyl vinyl ether by the same procedure as in Example 5. The resulting acetal was produced in a yield of 63% of theory and exhibited a VCS color of 3.

Repetition of the foregoing example omitting hypophosphorous acid yielded an acetal having a VCS of 11.

Example 7

127.2 g. (0.1 gram mol) of the dinonylphenyl monoether of a polyalkylene glycol, obtained by condensing dinonylphenol with 15 molecular equivalents of ethylene oxide and 5 molecular equivalents of propylene oxide, and 1.2 ml. of 50% hypophosphorous acid were mixed and the mixture dehydrated as in the preceding examples. 14.4 g. (0.2 gram mol) of ethyl vinyl ether were added over a period of 3 hours, while agitating the mixture at a temperature of 30–35° C. Agitation was continued for an additional hour at the same temperature and the mixture neutralized. The resulting product contained the acetal in a yield of 91.5% of theory, and exhibited a VCS color of 2.

Repetition of the procedure of this example substituting paratoluene sulfonic acid for hypophosphorous acid produced the actual in a yield of 88% of theory, having a VCS color of 12.

Example 8

244 g. (0.2 gram mol) of stearyl monoether of a mixed polyalkylene glycol, produced by condensing stearyl alcohol with 15 molecular equivalents of ethyleneoxide and 5 molecular equivalents of propylene oxide, were mixed with 0.7 g. of paratoluene sulfonic acid and 0.9 ml. of 50% hypophosphorous acid. After removal of moisture as in the preceding examples, 18 g. (0.25 gram mol) of ethyl vinyl ether were added over a period of 3½ hours while agitating at a temperature of 45–50° C. After completion of the reaction by agitating for an additional hour at the same temperature, and neutralizing, the product was found to contain the acetal in a yield of 84% of theory, and exhibited a VCS color of 1.

In a repetition of this example in which hypophosphorous acid was omitted and the amount of paratoluene sulfonic acid was increased to 1.2 g., the acetal was obtained in a yield of 75% of theory, having a VCS color of 8.

Example 9

527 g. (0.5 gram mol) of the dodecylphenyl monoether of polyethylene glycol, obtained by condensing dodecylphenol with 18 molecular equivalents of ethyleneoxide were mixed with 3 g. of 85% phosphoric acid and 1 ml. of 50% hypophosphorous acid, and the mixture was dehydrated as in the preceding examples. After cooling to 50–60° C., 49 g. (0.49 gram mol) of n-butyl vinyl ether were added over a period of 5 hours, while agitating at the aforesaid temperature. After agitating the mixture for an additional hour at the same temperature, it was neutralized with triethylamine and found to contain the acetal in a yield of 90% of theory, having a VCS color of 1.5.

Repetition of the procedure of this example, except that 2 g. of paratoluene sulfonic acid were substituted for the mixture of phosphoric and hypophosphorous acids produced the acetal in a yield of 88% of theory, but the product had a VCS color of 12.

Example 10

117 g. (0.5 gram mol) of the 2-ethyl-butyl monoether of triethyleneglycol, obtained by condensing 2-ethyl-butyl alcohol with 3 molecular equivalents of ethylene oxide, were mixed with 0.55 g. of paratoluene sulfonic acid and 0.5 ml. of 50% hypophosphorous acid. After dehydrating the mixture by heating under reduced pressure, 39.6 g. (0.55 gram mol) of ethyl vinyl ether were added over a period of 2.5 hours while agitating at 30–35° C. After completing the reaction by agitating at the same temperature for an additional hour, the mixture was neutralized with triethylamine. It was found to contain the resulting acetal in a yield of 50% of theory, having a VCS color of 2.

Repetition of this procedure, using 1.0 g. of paratoluene sulfonic acid and omitting hypophosphorous acid produced the acetal in a yield of 55% of theory, but having a VCS color of 11.

Example 11

136 g. (0.5 gram mol) of the phenyl monoether of tetraethylene glycol, obtained by condensing phenol with 4 molecular equivalents of ethyleneoxide, were mixed with 0.65 g. of paratoluene sulfonic acid and 0.5 ml. of 50% hypophosphorous acid. After removing moisture as in the preceding examples, 39.6 g. (0.55 gram mol) of ethyl vinyl ether were added, and condensed under the same conditions as in the preceding example. The neutralized reaction mixture contained the resulting acetal in a yield of 85% of theory, exhibiting a VCS color of 5.

Repetition of this procedure, employing 0.8 g. of paratoluene sulfonic acid, but omitting hypophosphorous acid, produced the same acetal having a VCS color of 9.

Example 12

89.9 g. (0.02 gram mol) of the phenyl monoether of polyethyleneglycol, obtained by condensing phenol with 100 molecular equivalents of ethylene oxide and having an initial VCS color of 5, were mixed with 0.4 g. of paratoluene sulfonic acid and 0.4 ml. of 50% hypophosphorous acid. After dehydrating the mixture as in the preceding examples, 2.2 g. (0.022 gram mol) of n-butyl vinyl ether were added and condensed under the same conditions as in Example 10. After neutralization, the reaction mixture containing the acetal exhibited a VCS color of 6.

Upon repeating the procedure of this example, using 0.6 g. of paratoluene sulfonic acid but omitting hypophosphorous acid, the resulting acetal was found to have a VCS color of 14.

In the foregoing examples, similar results are obtained when an equal amount of phosphorous acid is substituted for the hypophosphorous acid of the examples. Similar results are also obtained when salts of hypophosphorous or of phosphorous acid are substituted for the free acids. Similarly, esters of phosphorous acid, for example those enumerated in the discussion preceding the examples, produce the same improvement when substituted for hypophosphorous acid in the procedures of the foregoing examples. Mixtures of two or more of these color stabilizing agents can also be used.

Variations and modifications which will be obvious to those skilled in the art can be made in the foregoing procedures without departing from the scope or spirit of the invention.

I claim:

1. In a process for preparing surface-active acetals by mixing, at a condensation temperature in the presence of an acidic catalyst, a non-ionic surface-active glycol ether, corresponding to the formula

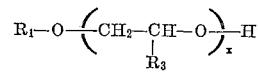

wherein $R_1$ is a member of the group consisting of alkyl, aryl and alkylaryl hydrocarbon groups of 8 to 30 carbon atoms, $R_3$ is a member of the group consisting of H and $CH_3$, and X is an integer from 1 to 100, and a vinyl ether having the formula

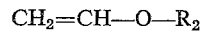

$$CH_2=CH-O-R_2$$

wherein $R_2$ is a hydrocarbon group containing 1 to 18 carbon atoms, the improvement of incorporating in the reaction mixture as a color stabilizer, prior to condensation of said glycol ether and said vinyl ether, a compound selected from the group consisting of hypophosphorous acid, phosphorous acid, salts of these acids and esters of phosphorous acid, in an amount from 0.01 to 5% of the weight of said non-ionic surface-active glycol ether.

2. Process as defined in claim 1 wherein said color stabilizer is a free acid serving additionally as the acidic catalyst to promote said condensation.

3. Process as defined in claim 1 wherein condensation is effected at a temperature of 30–60° C., and the amount of said color stabilizer is from 0.01 to 1.0% of the weight of said non-ionic surface-active glycol ether.

4. Process as defined in claim 3 wherein said non-ionic surface-active glycol ether is a mono-tridecyl ether of a polyethylene glycol having an average of 15 molecular equivalents of ethylene oxide in the polyethylene glycol moiety.

5. Process as defined in claim 3 wherein said non-ionic surface-active glycol ether is a nonylphenyl ether of a polyethylene glycol having an average of 1.5 to 9 molecular equivalents of ethylene oxide in the polyethylene glycol moiety.

6. Process as defined in claim 3 wherein said non-ionic surface-active glycol is a dinonylphenyl mono-ether of a polyethylene glycol having an average of 9.6 to 15 molecular equivalents of ethylene oxide in the polyethylene glycol moiety.

7. Process as defined in claim 3 wherein said non-ionic surface-active glycol ether is a dodecylphenyl mono-ether of a polyethylene glycol having an average of 18 molecular equivalents of ethylene oxide in the polyethylene glycol moiety.

8. Process as defined in claim 3 wherein said non-ionic surface-active glycol is an oleyl mono-ether of a polyethylene glycol having an average of 7 molecular equivalents of ethylene oxide in the polyethylene glycol moiety.

References Cited by the Examiner

UNITED STATES PATENTS 2,000,252   5/1935   Reppe et al. _____ 260—615

OTHER REFERENCES

Shostakouskii: Chem. Abs., vol. 41 (1947), page 1999.

LEON ZITVER, *Primary Examiner.*

CHARLES B. PARKER, *Examiner.*